Figure 1:
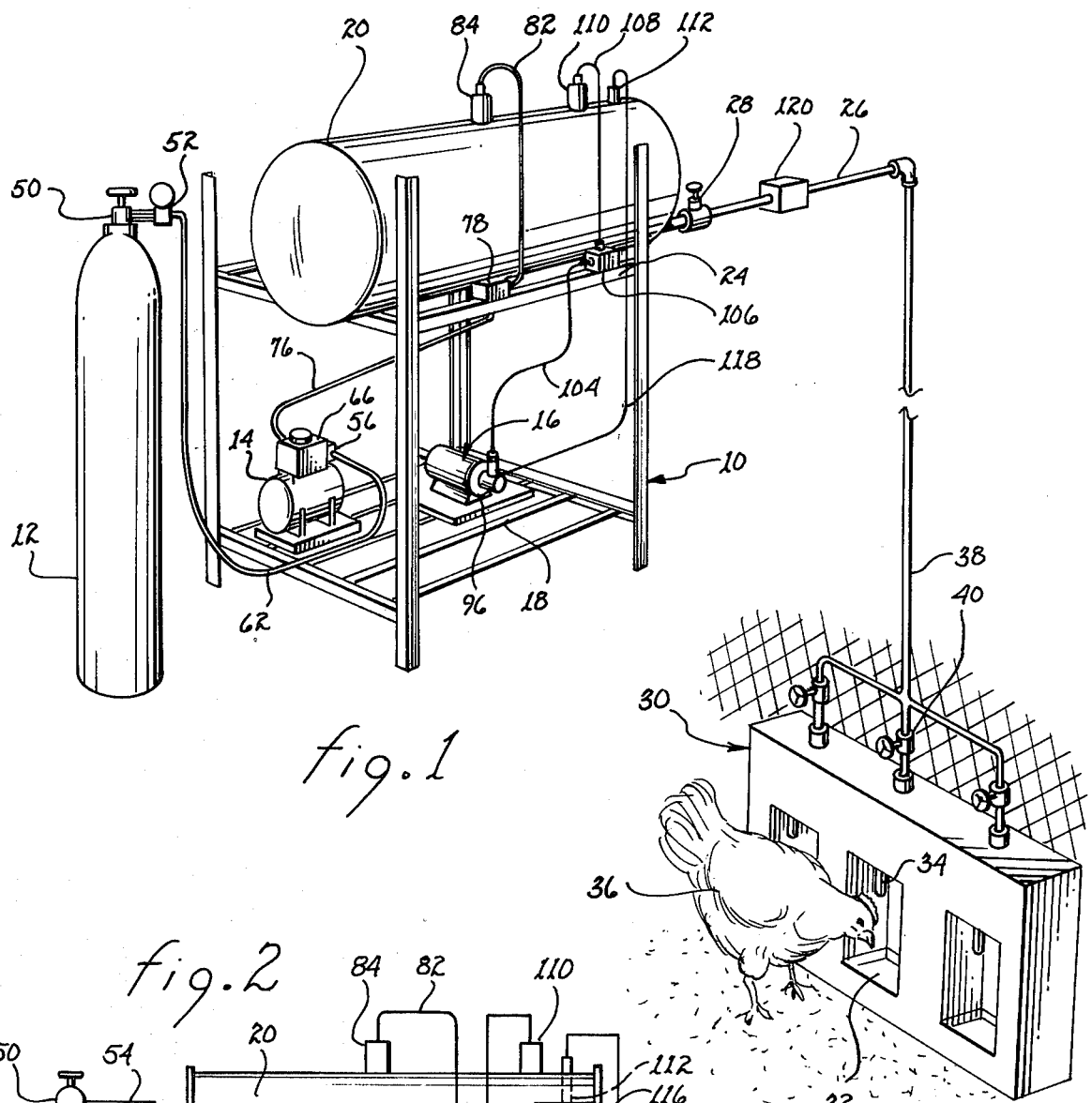

United States Patent [19]

Upperman

[11] Patent Number: 4,470,374
[45] Date of Patent: Sep. 11, 1984

[54] METHOD AND APPARATUS FOR EXTENDING THE EGG PRODUCTION CYCLE AND FOR HARDENING EGG SHELLS

[76] Inventor: John W. Upperman, 1432 E. Monte Vista, Phoenix, Ariz. 85006

[21] Appl. No.: 499,986

[22] Filed: Jun. 1, 1983

[51] Int. Cl.³ .............................................. A01K 39/02
[52] U.S. Cl. ......................................... 119/72; 119/75
[58] Field of Search .......................... 119/72, 72.5, 75; 137/391; 261/DIG. 7

[56] References Cited

U.S. PATENT DOCUMENTS

| | | | |
|---|---|---|---|
| 2,588,677 | 3/1952 | Welty et al. | 261/DIG. 7 |
| 2,845,046 | 7/1958 | Hart | 119/75 |
| 3,303,824 | 2/1967 | Anderson | 119/72.5 |
| 3,437,075 | 4/1969 | Hawes, Jr. et al. | 119/51 R |
| 3,582,006 | 6/1971 | Thompson | 119/72.5 X |
| 3,756,576 | 9/1973 | Tremolada | 261/DIG. 7 |
| 4,149,490 | 4/1979 | English | 119/72 |
| 4,187,262 | 2/1980 | Fessler et al. | 261/DIG. 7 |

Primary Examiner—Hugh R. Chamblee
Attorney, Agent, or Firm—Cahill, Sutton & Thomas

[57] ABSTRACT

A method and apparatus for feeding egg laying hens carbonated water on demand to modify the normal egg laying cycle of hens by increasing substantially the length of the continuous egg laying period and to increase the hardness of the egg shells and reduce losses due to egg breakage.

22 Claims, 2 Drawing Figures

U.S. Patent  Sep. 11, 1984  4,470,374

METHOD AND APPARATUS FOR EXTENDING THE EGG PRODUCTION CYCLE AND FOR HARDENING EGG SHELLS

The present invention relates to poultry husbandry and, more particularly, to increasing the length of the egg laying period and to reducing egg breakage.

Commerical egg production is carried out on egg farms having massive buildings containing tens of thousands of hens per building. The temperature and air circulation within each house is controlled by automated equipment to optimize the environment pursuant to the results of various scientific investigations. The food fed the hens is based upon experience and the results of innumerable experiments conducted by various feed supply companies, universities and commercial experiments. Often, the feed is supplemented with various elements during different stages of life of the poultry. U.S. Pat. No. 3,437,075 describes a particular apparatus for supplementing feed for poultry with controlled portions of various supplements.

With the very many investigations conducted to date in combination with the years of experience represented by the owners and operators of a multitude of egg farms, certain patterns in the egg laying process have become thought to be immutable. It is well accepted that each hen is capable of laying a specific limited number of eggs, irrespective of the environment or feed provided during the life of the hen. Another accepted fact attendant egg laying hens is that egg production will occur for two forty week periods bracketing a two month molting period during which no eggs are layed. Despite the lack of egg production during the molting period, the expenses attendant housing, feeding and care of the hens continue with the expectation that the expenses will be recouped during the second forty week egg laying period.

The hardness of egg shells produced has an obvious relationship to the extent of egg breakage due to handling. It is therefore desireable to maintain the egg shells sufficiently hard to avoid breakage from normal handling. Through various studies, it has been learned that egg shell quality deteriorates when the hens are subjected to high temperature and humidity. This results because the hens begin to pant in an effort to remain cool. Such panting reduces below normal the carbon dioxide level in the lungs of the hens.

Various attempts have been made to at least restore and preferably increase the carbon dioxide level in hens. One such experiment performed at the University of Illinois included the creating of an atmosphere in the hen houses having an above normal level of carbon dioxide. This experiment did not preduce the results sought. Other experiments for this purpose have included adding carbonated supplements to the feed given the hens. These experiments also did not provide any significant change in the egg production rate or egg shell quality.

Various U.S. patents have issued directed to the above described research attendant care and feeding of poultry to increase egg production. U.S. Pat. No. 3,410,690 describes a feed supplement to be added to the drinking water for poultry. U.S. Pat. No. 4,149,490 is directed to a watering trough for poultry which injects small bubbles through the water to attract the attention of poultry and urge greater fluid consumption. U.S. Pat. Nos. 2,845,046 and 3,582,006 discuss water supply devices and drinking valves for poultry or other livestock. U.S. Pat. No. 3,303,824 is directed to apparatus for pressurizing a livestock liquid feed dispenser. U.S. Pat. No. 3,845,208 recites an ingested supplement which is alleged to result in larger sized eggs. U.S. Pat. No. 2,588,677 describes apparatus for carbonating a liquid.

The present invention is directed to apparatus for inexpensively increasing the ingestion by poultry of carbon dioxide on an ongoing basis. Such ingestion produces harder shelled eggs. In addition, the continuous and ongoing ingestion of carbon dioxide alters the physiological egg laying cycle of hens from a normal forty week period to at least a sixty week period without an interim nonproductive molting period.

It is therefore a primary object of the present invention to provide a method for extending the egg laying period of hens.

Another object of the present invention is to provide a method for increasing egg production at an egg farm by reducing egg breakage due to thin egg shells.

Still another object of the present invention is to provide a method for increasing the revenue generating capability of egg laying hens during their egg laying cycle.

Yet another object of the present invention is to provide apparatus useable in conjunction with existing water supply systems to increase the length of the continuous egg laying period of hens.

A further object of the present invention is to provide apparatus for feeding on demand carbonated water to egg laying hens.

A still further object of the present invention is to provide simple and inexpensive apparatus useable in conjunction with existing water supply systems for providing carbonated water to egg laying hens.

A yet further object of the present invention is to provide a method for altering the egg laying cycle of hens to eliminate their egg laying dormancy period.

These and other objects of the invention will become apparent to those skilled in the art as the description of the present invention proceeds.

Figure 2:
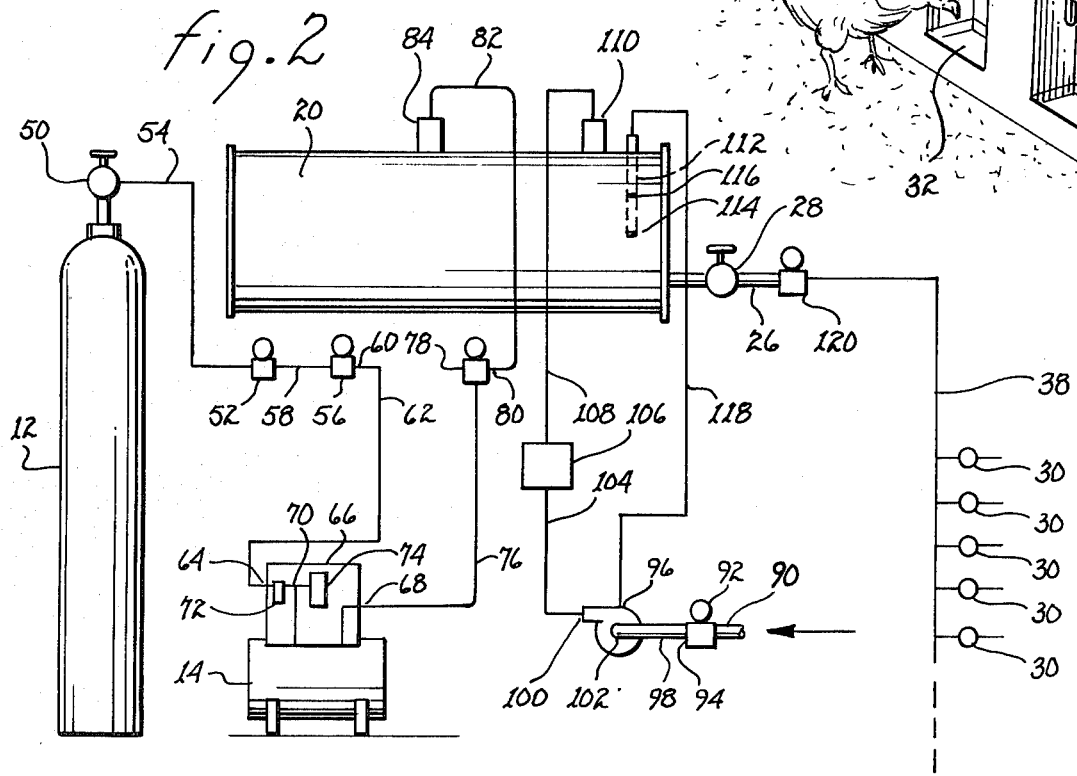

The present invention may be described with greater specificity and clarity with reference to the following drawings, in which:

FIG. 1 is a representation of the apparatus necessary to exercise the present invention; and FIG. 2 illustrates a flow diagram of the operation of the present invention.

Referring to FIG. 1, there is shown a superstructure 10 for supporting the various elements of the invention. A cylinder 12 for supplying carbon dioxide may be supported upon superstructure 10 or located apart therefrom, as illustrated. The latter may be preferable as the cylinder must be periodically replaced. An air compressor unit 14 and a water pump unit 16 are secured to a platform 18 of the superstructure. A tank 20 is attached to a further platform 24. An outlet conduit 26 is connected with tank 20, through valve 28 to regulate flow from the tank. The number of tanks (20) employed is a function of the degree of redundancy required and the outflow capacity necessary to meet the fluid flow demands imposed.

The present invention is directed primarily to a method for feeding egg laying poultry with a solution of water and carbon dioxide. Ingestion of such solution modifies the egg laying cycle by eliminating or deferring the previously required molting period and increasing the egg laying period. The resulting commercial benefits of not having to feed egg laying poultry during an extended nonproductive molting period intermediate two egg laying periods do not require further elaboration.

Many demand feeders for use by poultry to dispense a fluid for drinking purposes are commercially available. In FIG. 1, there is illustrated in representative form only a demand feeder 30. Such a feeder includes a pan 32 for receiving fluid emitted from a nozzle 34. Flow through the nozzle may be actuated by the poultry, such as hen 36 pecking upon pan 32. The nozzle is in fluid communication with conduit 26 through pipe 38; a shut off valve 40 may be employed to terminate flow through nozzle 34.

It may be noted that in commercial egg production facilities, known as egg farms, one or more egg laying hens are housed within relatively confining wire cages. Thus, the seeming freedom of movement available to hen 36 as illustrated in FIG. 1 is fictitious.

Referring to FIG. 2, there is shown a flow diagram attendant the present invention. Carbon dioxide from cylinder 12 flows through shut off valve 50 and to high pressure regulator 52 through pipe 54. The output of high pressure regulator 52 is interconnected with the input of low pressure regulator 56 through pipe 58. In one embodiment of the present invention, the pressure of the carbon dioxide at outlet 60 of the low pressure regulator is 4 psig. The low pressure carbon dioxide flows through pipe 62 to inlet 64 of a commercially available blender 66. The blender is in fluid communication with air compressor 14 to provide a mixture of air and carbon dioxide under pressure at outlet 68.

Briefly, blender 66 provides an inflow to compressor 14 through a T-connection 70. One arm of the T-connection is in fluid communication with inlet 64 through a solenoid operated valve 72. The other arm of T-connection 70 includes an air filter 74 for filtering air drawn into the T-connection. The base of the T-connection is in fluid communication with the inlet to compressor 14. As discussed above, the carbon dioxide is at a pressure of 4 psig at inlet 64 while the air is at ambient pressure about filter 74. On energization of air compressor 14, valve 72 is actuated to permit flow of the carbon dioxide into the T-connection. The air compressor draws a mixture of carbon dioxide and air through the base of the T-connection in proportion to the flow constraints and pressures attendant the arms of the T-connection.

The air and carbon dioxide mixture present at outlet 68 and flowing into pipe 76 may be at a pressure of approximately 60 psig. A regulator 78 reduces the pressure of the air and carbon dioxide mixture to approximately 35 psig at outlet 80. Pipe 82 conveys the air and carbon dioxide mixture from outlet 80 into tank 20 through a check valve 84.

Water from a source under pressure conveys water through a pipe 90 to regulator 92. The pressure of the water at outlet 94 of the regulator may, in one embodiment, be approximately 20 psig. This water is conveyed to the inlet 100 of pump 96 through a conduit 98. The pump may be any one of several commercially available pumps which includes a selfactuating mechanism for retaining the pump de-energized until the pressure at pump outlet 102 exceeds the pressure at inlet 100. Outlet 102 is connected to a conduit 104 for conveying water to a pressure sensitive switch 106. The switch is operatively connected to pump 96 to limit the output pressure thereof. In one embodiment, the setting is approximately 65-70 psig. Outflow from switch 106 is conveyed through conduit 108 to tank 20 through check valve 110.

A water level sensing probe 112 extends into tank 20 to regulate and maintain the water level therein. The probe may include a low level sensing element 114 and a high level sensing element 116. Should the water level in the tank drop to element 114, an electrical signal is generated and transmitted through conductor 118 to pump 96 and cause actuation of the pump. When the water level reaches element 116 a further electrical signal is generated to deactivate pump 96.

The pressure within the headspace in the tank is maintained at a minimum level of 35 psig in response to the outflow of air and carbon dioxide mixture through outlet 80 of regulator 78. Thus, the back pressure continuously sensed by pump 96 through conduits 108 and 104 is approximately 35 psig. This back pressure is greater than the inlet pressure regulated by regulator 90. Therefore, one of the prerequisites for operation of pump 96 is satisfied and the pump will become energized in response to an electrical signal from element 114 through conductor 118 and pump water into tank 20.

At the lowest water level, the pressure in the head space of tank 20 will be at 35 psig. The pressure in the head space will increase as the tank is filled to the highest water level and flow of the air and carbon dioxide mixture into the tank will cease. The carbon dioxide will be absorbed by the water in the tank and the pressure within the headspace will reduced because of such absorbtion. The air will become entrained with the water. Further, reduction in head space pressure will occur as water is drawn from the tank. When the pressure in the head space reduces to below 35 psig, a mixture of air and carbon dioxide will be introduced in sufficient quantity to maintain the head space at a pressure of essentially 35 psig. Thereby, the water within tank 20 is repetitively charged with carbon dioxide.

In practice, tank 20 is maintained approximately ¾ filled with water and the remaining space is occupied by the air and carbon dioxide mixture. Carbon dioxide under pressure is relatively soluble in water and the water within the tank may be referred to as carbonated water.

The carbonated water is discharged from the tank through pipe 26 upon opening of valve 28. Downstream therefrom, regulator 120 limits the pressure of the carbonated water flowing through pipe 38 to the input pressure dictated by demand feeders 30; this pressure may be in the range of 4 to 13 psig, depending upon manufacturing and operational requirements of the various available commercial demand feeders. It is preferred to use a demand feeder rather than some other type of watering device to minimize the presence of standing water since the carbon dioxide will percolate out from unpressurized water after a period of time.

In the embodiment of the present invention referenced above, the mixture ratio of carbon dioxide to water is approximately 2.2 pounds of liquid carbon dioxide per 1,000 gallons of water. With such a ratio, the egg laying period was extended beyond the conventional and accepted physiologically dictated initial forty week period; moreover, the egg shells were maintained sufficiently hard to reduce the normal egg breakage rate to a nominal rate. The effect upon egg shell hardness was tested by terminating operation of the apparatus for a two week period. Shortly after termination, the hardness of the egg shells decreased resulting in a substantially greater egg breakage rate. On resumption of operation of the apparatus, the egg shells became harder and the egg breakage rate reduced dramatically. Accordingly, the commercial advantages of the present invention are of significant magnitude.

While the principles of the invention have now been made clear in an illustrative embodiment, there will be immediately obvious to those skilled in the art many modifications of structure, arrangement, proportions, elements, materials and components, used in the practice of the invention which are particularly adapted for specific environments and operating requirements without departing from those principles.

I claim:

1. A method for supplying carbonated water to poultry to increase the egg laying period of the poultry and to harden the shells of eggs laid, said method comprising the steps of:
   (a) introducing water under pressure to a tank;
   (b) injecting carbon dioxide under pressure in a gaseous state into the tank to develop carbonated water;
   (c) conveying the carbonated water under pressure from the tank;
   (d) interconnecting the conveyed carbonated water with at least one poultry demand feeder;
   (e) discharging the carbonated water through each poultry demand feeder; and
   (f) regulating the pressure during said conveying and interconnecting steps to retain the carbon dioxide in solution upon discharge through each poultry demand feeder.

2. The method as set forth in claim 1 including the step of mixing air with the carbon dioxide prior to exercise of said injecting step.

3. The method as set forth in claim 2 wherein the step of regulating maintains the pressure of the carbonated water present at the demand feeders at a pressure in the range of 4–13 psig.

4. The method as set forth in claim 1 including the step of maintaining the level of the water in the tank within a predetermined range.

5. The method as set forth in claim 4 including the step of mixing air with the carbon dioxide prior to exercise of said injecting step.

6. The apparatus for supplying carbonated water to poultry to increase the egg laying period of the poultry and to harden the shells of eggs laid, said apparatus comprising in combination:
   (a) a tank;
   (b) means for introducing water under pressure to said tank;
   (c) means for injecting carbon dioxide under pressure in a gaseous state into said tank to develop carbonated water;
   (d) means for conveying the carbonated water under pressure from said tank;
   (e) at least one poultry demand feeder;
   (f) means for interconnecting the conveyed carbonated water with each said demand feeder;
   (g) means for discharging the carbonated water through each said demand feeder; and
   (h) means for regulating the pressure in said conveying and interconnecting means to retain the carbon dioxide in solution upon discharge through each said demand feeder.

7. The apparatus as set forth in claim 6 including means for mixing air with the carbon dioxide prior to injection of the carbon dioxide into said tank.

8. The apparatus as set forth in claim 7 wherein said regulating means maintains the pressure of the carbonated water in a range of 4–13 psig.

9. The apparatus as set forth in claim 6 including means for maintaining the level of the water in said tank within a predetermined range.

10. The apparatus as set forth in claim 9 including means for mixing air with the carbon dioxide prior to injection of the carbon dioxide into said tank.

11. A method for feeding carbonated water from a pressurized tank on demand to poultry to extend the egg laying period and increase the hardness of the eggs laid, said method comprising the steps of:
    (a) injecting carbon dioxide under pressure into the tank;
    (b) introducing water into the tank at a pressure greater than the pressure of the injected carbon dioxide to form the carbonated water;
    (c) maintaining the level of the water within the tank between predetermined levels;
    (d) periodically drawing the carbonated water from the tank;
    (e) conveying the drawn off carbonated water to a feeder for the poultry; and
    (f) regulating the pressure of the conveyed carbonated water at a pressure greater than atmospheric pressure to maintain the carbon dioxide in solution.

12. The method as set forth in claim 11 including the step of mixing the carbon dioxide with air prior to injection of the carbon dioxide into the tank.

13. The method as set forth in claim 12 wherein said step of mixing includes the step of pressurizing the air and carbon dioxide to a pressure of 35 psig.

14. The method as set forth in claim 13 wherein said step of introducing includes the step of pressurizing the water to a pressure in the range of 65–70 psig.

15. The method as set forth in claim 11 wherein said steps of injecting and introducing mix carbon dioxide and water in a ratio of two pounds of liquid carbon dioxide with one thousand gallons of water.

16. The method as set forth in claim 11 wherein said step of maintaining includes the step of cycling the water fill and further includes the step of inhibiting water flow into the tank unless a charge of carbon dioxide is introduced during each cycle of water fill.

17. Apparatus for feeding carbonated water from a pressurized tank on demand to poultry to extend the egg laying period and increase the hardness of the eggs laid, said apparatus comprising in combination:
    (a) means for injecting carbon dioxide under pressure into the tank;
    (b) means for introducing water into the tank at a pressure greater than the pressure of the injected carbon dioxide to form the carbonated water;
    (c) means for maintaining the level of the water within the tank between predetermined levels;
    (d) means for periodically drawing the carbonated water from the tank;
    (e) means for conveying the drawn off carbonated water to a feeder for the poultry; and
    (f) means for regulating the pressure of the conveyed carbonated water at a pressure greater than atmospheric pressure to maintain the carbon dioxide in solution.

18. The apparatus as set forth in claim 17 including means for mixing the carbon dioxide with air prior to injection of the carbon dioxide into the tank.

19. The apparatus as set forth in claim 18 including means for pressurizing the air and carbon dioxide to a pressure of 35 psig.

20. The apparatus as set forth in claim 19 including means for pressurizing the water to a pressure in the range of 65–70 psig.

21. The apparatus as set forth in claim 17 wherein said injecting means and said introducing means mix the carbon dioxide with the water in a ratio of two pounds of liquid carbon dioxide with one thousand gallons of water.

22. The apparatus as set forth in claim 17 wherein said maintaining means includes means for cycling the water fill and means for inhibiting water flow into the tank unless a charge of carbon dioxide is introduced during each cycle of water fill.

* * * * *